United States Patent [19]
Bruneau

[11] 3,733,679
[45] May 22, 1973

[54] PHOTOGRAPHIC CASSETTE LOADING

[75] Inventor: Louis O. Bruneau, Weston, Mass.

[73] Assignee: Polaroid Corporation, Cambridge, Mass.

[22] Filed: Apr. 21, 1971

[21] Appl. No.: 136,070

[52] U.S. Cl. ................................29/431, 29/211 L
[51] Int. Cl. ..........................B23p 19/00, B23q 7/10
[58] Field of Search......................29/431, 430, 429, 29/211 L, 200 B

[56] References Cited

UNITED STATES PATENTS 3,325,889   6/1967   Meli et al. ......................29/200 B X
3,457,627   7/1969   Napor et al............................29/430

Primary Examiner—Thomas H. Eager
Attorney—Brown & Mikulka and Sheldon W. Rothstein

[57] ABSTRACT

Cassettes in which photographic film units are contained and exposed are loaded with battery means, spring means and photographic film units by forming a stack of components, compressing the stack and inserting it partially into the mouth of an open cassette, removing the compressive force and inserting the stack or components the rest of the way into the cassette.

10 Claims, 3 Drawing Figures

INVENTOR.
LOUIS O. BRUNEAU

BY

Brown and Mikulka
and
Sheldon W. Rothstein
ATTORNEYS

PATENTED MAY 22 1973

INVENTOR.
LOUIS O. BRUNEAU

BY
Brown and Mikulka
and
Sheldon W. Rothstein
ATTORNEYS

PHOTOGRAPHIC CASSETTE LOADING

BACKGROUND OF THE INVENTION

U. S. Pat. No. 3,481,261, for example, discloses the general concept of combining a film assemblage with a battery for operating the components of a photographic apparatus in which the assemblage is adapted to be exposed. In the denoted patent, a battery is located within a film cassette and provides the function of driving a film winding apparatus.

In associating power means, such as a battery, with film units, the ultimate package produced generally results in a large and cumbersome configuration. One way of reducing the size of a cassette comprising a power means is to provide such power means in a configuration which is substantially planar and generally rests in a plane parallel to the planes of film units utilized therewith. For example, see U. S. Pat. Nos. 3,543,662 and 3,561,339. It will be evident that such a configuration will have the capacity for providing power to a photographic apparatus provided the power means, for example, a battery, can be reliably placed in contact with terminals integral with the photographic apparatus, and sufficient contact is assured to facilitate a transfer of power to provide the requisite functions of the photographic apparatus. it has been recognized, for example, in the last two denoted patents, that such contact may be assured if a spring means is utilized with a battery to exert a force on the terminals thereof in the direction of mating terminals within the body of the photographic apparatus designed to receive the cassette containing the battery. However, since the cassette itself is designed to encompass substantially only enough space for the components which are to be contained therein, the determination of a technique for inserting, by reliable mass production systems, a spring-biased stack of components therein becomes a principal problem. The instant invention solves that problem.

It is accordingly an object of this invention to provide a method for producing a cassette containing photographic film units, a power supply and a spring means in stacked relationship, which comprises the concomitant insertion of all components into the cassette. Another object of the present invention is to provide a sequential series of steps for inserting the aforenoted materials into the cassette while obviating misalignment and similarly related problems.

These and other objects of the invention will in part be obvious and will in part appear hereinafter. The invention accordingly comprises the several steps and the relation and order of one or more of such steps with respect to each of the others as exemplified in the following detailed disclosure and the scope of the application of which will be indicated in the claims.

BRIEF DESCRIPTION OF THE DRAWINGS

For a fuller understanding of the present invention, reference may be had to the following detailed description taken in conjunction with the accompanying drawings wherein.

DETAILED DESCRIPTION OF THE INVENTION

Figure 1:
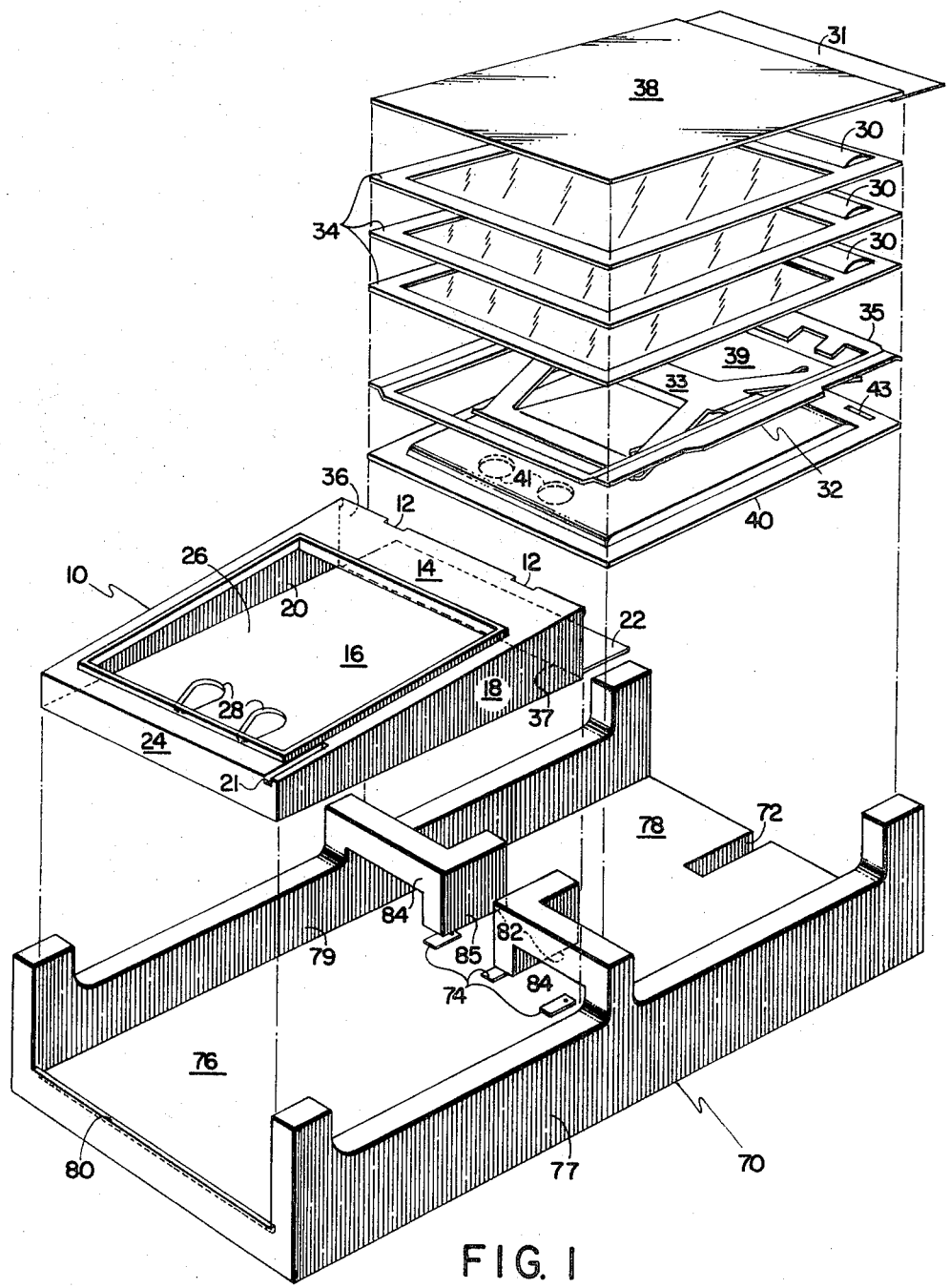
FIG. 1 is an exploded perspective view, partly broken away, showing a photographic film cassette, the components preferably to be inserted therein, and a collating or alignment fixture which may optimally be used to facilitate the method of the present invention.
Figure 2:
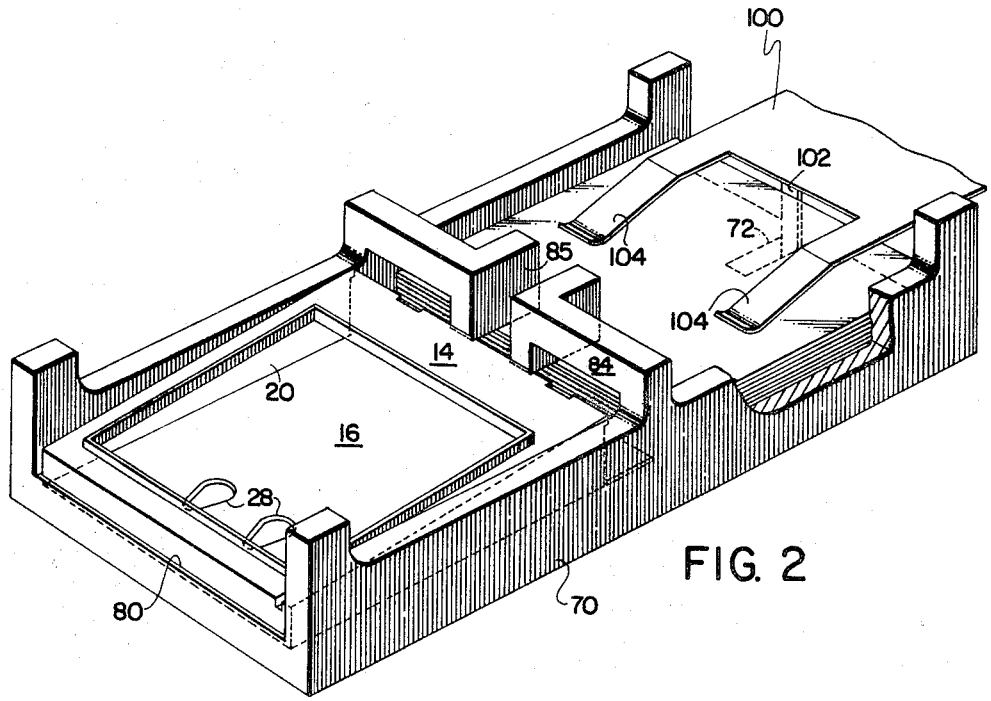
FIG. 2 is a perspective view showing the components of the cassette in partial cut-away configuration in a partially inserted state under compressive force.
Figure 3:
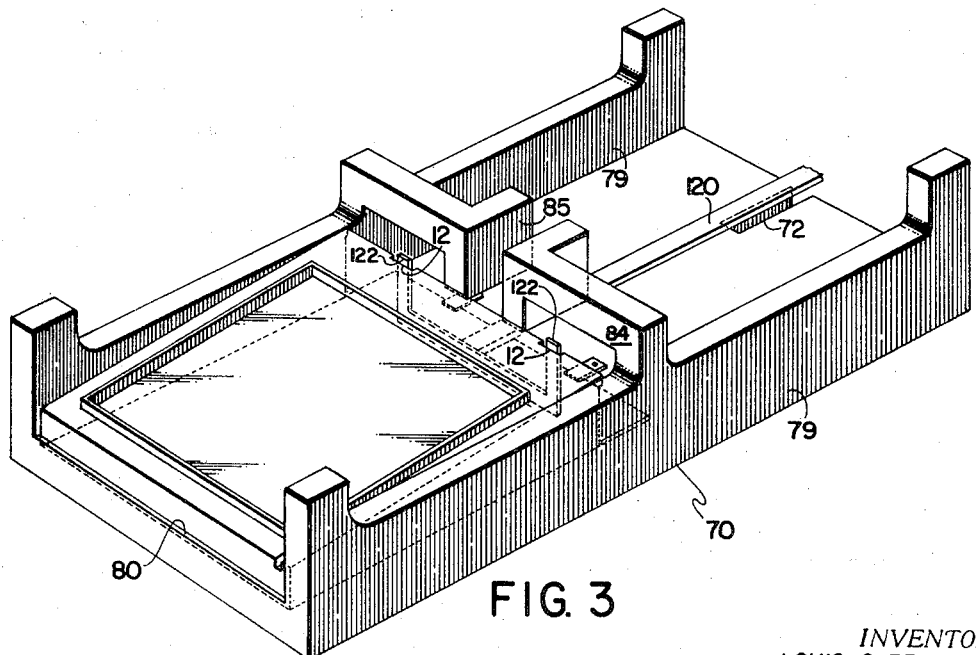
FIG. 3 is a perspective sectional view with a cut-away portion depicting the full insertion of the components into the cassette.

FIGS. 1 through 3 depict, in general, a preferred implementation of the principals of the present invention. In the embodiment illustrated in the denoted figures, a film cassette 10 is illustrated and preferably comprises an injection molded plastic unit having a forward wall 14, a rear wall 16, side walls 18 and 20, and end walls 22 and 24. The cassette 10 is tapered convergently in the direction in which it is to be inserted into a photographic apparatus in order to accommodate asymmetries in the thickness of the contents of the cassette and, further, in order to prevent insertion of the wrong end of the cassette into a photographic apparatus.

The forward wall 14 of the cassette generally defines a light-transmitting area 26 through which light is capable of being admitted in order to provide photoreaction stimulus to the film units contained within the cassette. In the preferred embodiment, area 26 is an aperture in wall 14. However, for certain purposes, it may be advantageous to utilize a transparent material such as, for example, a film of polymethyl methacrylate, as area 26.

The ultimate contents of the cassette 10 include, at least, a stack of film units 34, depicted herein as being of the "self-developing" type, each including a container 30 of processing fluid adapted to be spread within the film unit to form a visible image, a spring means 32, and a dark slide 38 — the container 30 being rupturable by compressive pressure.

The depicted spring means 32, in this case a platen, is shown between the stack of film units 34 and a power supply means 40, which comprises a substantially flat battery in the illustration. The platen 32, when in the compressed configuration, rests on the top of battery 40 and applies compression force thereto to urge the contacts thereof into close association with mating contact in an appropriate photographic apparatus used therewith through apertures 28 in cassette 10. The platen 32 also urges the film units 34, in succession, into a proper focal plane position for exposure through area 26. Also denoted in the present preferred configuration is dark slide 38 which acts to prevent fogging of film units 34 contained in cassette 10 prior to their intentional exposure, the depicted dark slide 38 comprising skirt 31 which, during loading is folded down over the trailing end of the film units to provide an added light seal.

The body of cassette 10 and end wall 22 are preferably injection molded as a unitary structure with end wall 22 connected to the casing body by an integral hinge 37. In the context of the present invention, the total loaded cassette is assembled by forming, in a preliminary operation, a stack which comprises at least a spring means, in this instance denoted as platen 32, a stack of photosensitive film units 34, and a dark slide 38, preferably in a collating or alignment fixture 70 which holds the components of such a stack in alignment opposite the opening 36 of cassette 10, one side of said opening being defined by an edge of said forward wall. The preferred stack of components includes power supply means 40. The stack is then compressed, for example, by moving arm unit 100, which is attached to rod 102, by conventional means, in a direction whereby compression force is imparted to the stack by arms 104, and subsequent to the application of sufficient compression force, rod 100 is moved toward opening 36 of cassette 10 through fixture groove 72 to move the leading end of the compressed stack part way into cassette 10. In essence, rod 102 and attached arm unit 100 will move, by conventional means, through square wave motion — the operation sequence being down; forward; up; backward.

Partial insertion of the stacked components into the cassette is accomplished, preferably, by impinging rod 102 against the trailing end of the compressed stack of components as it moves into fixture groove 72. After partial insertion, compression force is removed and, through a ram action, the components of the stack are caused to move the rest of the way into the cassette. This is preferably accomplished, for example, by using a double forked motivating means 120 which mates with grooved portions 12 on the cassette in order to ascertain that the components have been fully inserted therein by tines 122.

Various configurations of collating fixtures which would be found useful in the present invention will come to mind of those of ordinary skill in the art. It has been found preferable to use, however, a fixture as depicted in FIGS. 1, 2 and 3 which comprise separate compartments 76 and 78, one of which, 76, is capable of receiving an opened cassette and assuring that the end wall 22 of such cassette is held in the open position by, for example, fingers 74 which additionally provide a slide surface for stacked components, and a second compartment 78 in which the cassette components may be stacked for the compression and subsequent insertion steps. Integral with this section of the fixture is, preferably, a grooved portion 72 which accommodates a rod portion 102 integral with the compression-applying arms 104. As denoted above, rod 102 may also provide the function of moving the stacked components into the cassette. The stacked components, during the initial insertion step, are pushed into the cassette only far enough so that the cassette mouth itself and/or fixture surfaces provides a sufficient compression force to enable the compression tool 100 to be disengaged without causing decompression of the spring. Subsequent insertion may be provided by a straight ram action.

In essence, then, the present invention recognizes that spring biased film units and a dark slide, preferably with power means, may be packaged in a cassette whose dimensions are substantially that of the compressed stack of materials by sequentially: placing such stack opposite an adequate opening of the cassette container; compressing the stack and partially inserting the compressed units into the container; removing the compression force; and applying a ram motion to fully insert the units, dark slide, any power supply, and spring means into the container.

Integral with compartment 76 is lip 80 against which wall 24 of cassette 10 butts in order to maintain the position of cassette 10 relatively constant against the forces applied to it through tools 100 and 120. Fingers 74 provide the dual function of holding wall 22 of cassette 10 open and providing a funneling function in conjunction with the bottom surfaces 82 of positioning projections 84, which serve the function of separating fixture 70 into compartments 76 and 78.

Looking now to the specific relationship between the stacked components in the preferred embodiment of the present invention, battery 40 will be placed by suitable means as, for example, conventional conveyor means, onto the face of fixture compartment 78 and preferably comprises slots 43 into which mating portions of platen 32 are preferably inserted in order to provide proper component indexing and assure little relative motion between the platen and the battery. The platen is deposited, again by conventional transfer means, with the mating platen portions fitting slots 43 of the battery. See copending U. S. Pat. application Ser. No. 136,029, filed in the name of Nicholas Gold on Apr. 21, 1971. Looking specifically at the platen, it will be appreciated that compressive force applied to platen cross bar 33 will be transmitted to platen frame 35 in order to place frame 35 generally in a plane approaching the plane of the platen bias-providing projections 39. Deposited upon seated platen 32 are a multiplicity of film units 34 and a dark slide 38. As compressive force is applied, for example, by arms 104 in the general area of cross bar 33, the entire stack of components is compressed to a height slightly less than the distance between the lowermost surfaces 82 of positioning projections 85 and the slide face of fixture 70. The lowermost surfaces 82 of projections 85, as a matter of fact, may be slightly angled to provide, in conjunction with fingers 74, a suitable compression conduit for inserting the compressed stack of material into the opening of the cassette which is held securely in place in compartment 76 by fingers 74 and lip 80.

In the event "instant photography" type film units are utilized in the present invention, care must be taken that the unit applying compressive force to the stack of components does not apply pressure to the containers 30 sufficient to rupture them. The described system utilizing a platen with a central cross member assures that force components are applied around the periphery of the film units and results in a system which substantially obviates the possibility of container rupture. In essence, compression forces are applied to the film units at points which cannot cause rupture of processing composition retaining containers integral with the film units.

Since, in the utilization of the depicted "instant photograpyy" film units, the trailing end of the component stack will be thicker than the leading end due to the presence of processing composition-retaining containers adjacent the trailing end, the cassette is convergently configured from the opening through which components are inserted. Accordingly, the fact that the thinnest end of the stacked components enters the widest section of the cassette, provides additional attractiveness to the instant method since the convergent cassette walls progressively impart compression force to the platen as the components are moved therein.

While the side walls 77 and 79 of the collating fixture 70 have been pictured equidistant throughout their length, it will be appreciated that for indexing purposes, the side walls of compartments 78 may be spaced slightly closer than the side walls of compartment 76 since the width of the components which are to be put into the cassette is naturally narrower than the distance between the external surfaces of side walls 18 and 20 of the cassette.

Slot 21 depicted in the lower right-hand corner of the cassette provides access for any suitable mechanism such as, for example, that disclosed in copending U.S. Pat. application Ser. No. 67,051 of Irving Erlichman, filed Aug. 26, 1970, now U.S. Pat. No. 3,699,865 to provide removal means for an exposed film unit from the cassette.

At such time as cassette 10 has been filled with the biased components, it is preferably removed from the fixture and end 22 is folded into intimate relationship with side walls 18 and 20 and welded thereto, preferably utilizing ultrasonic means. In order to provide an appropriate slot for egress of each exposed film unit, end wall 22 is slightly narrower than the mouth of the cassette, thereby leaving a passageway between the top of end wall 22 and the bottom of cassette top wall 14. See copending Pat. application Ser. No. 784,160, filed Dec. 12, 1968 in the name of Nicholas Gold, now U.S. Pat. No. 3,607,283.

With particular reference now to FIG. 2, it will be seen that the stack of components is depicted in a compressed condition, compression stimulus having been applied by arms 104, and is partially moved in a direction toward an opening of the cassette under the lower surfaces 82 of projections 85. Preferably, as has been aforenoted, the compressed materials will be inserted only a sufficient distance into the cassette to enable the cassette itself and/or fixture components to supply sufficient compressive force for the stack to remain in the compressed configuration. The compression force-applying tool is removed by lifting arms 104 through connecting rod 102 at which time preferably fixture 70 moves to a subsequent station where tines 122, connected to rod 120, provide motivating stimulus to completely fill the cassette with the compressed pack. Note that the tines 122 are preferably mated with indentations 12 in the cassette and slide under the compartmenting fixture projections 84 in order to provide a rigidly controlled filling and indexing function. During the denoted loading function, in the preferred embodiment, skirt 31 on dark slide 38 is preferably in the folded down position so that it substantially covers the egress port ultimately formed between the cassette forward wall 14 and closed hinged wall 22 until the dark slide is removed from the cassette.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A method for loading a cassette with photographic film units which comprises:
   providing a cassette having a forward wall including a light-transmitting portion through which a film unit can be exposed, and further having an opening at one end for receiving the ultimate contents of the cassette, one side of said opening being defined by an edge of said forward wall;
   stacking, in alignment with said opening, components comprising spring means, a multiplicity of photographic film units and a dark slide;
   applying first compression means to said components to compress said spring means;
   moving said compressed stacked components toward said opening;
   engaging the leading end of said stacked components by second compression means to maintain compression of said spring after disengagement of said first compression means;
   disengaging said first compression means from said stacked components following engagement of said second compression means; and
   thereafter moving said components fully into said cassette.

2. The method of claim 1 wherein said stacked components include a substantially planar battery, said battery is aligned substantially parallel with said photographic film units and has integral therewith terminals capable of mating with external contacts, said cassette comprises a rear wall having two apertures, and said terminals of said battery are aligned with the apertures of said rear wall after full movement of said stacked components into said cassette whereby access to said terminals by said external contacts is facilitated.

3. The method of claim 2 wherein said second compression means comprises the walls of said cassette which define said opening.

4. The method of claim 3 wherein said cassette comprises, as a hinged element depending from an edge of one wall thereof defining said opening, an opening closure wall which is maintained by holding means is an open position during component loading into the cassette.

5. The method of claim 4 wherein said closure wall provides an egress means for said film units when in the closure position across said opening.

6. The method of claim 4 wherein after said components are fully loaded into said cassette, said hinged wall is moved into an opening closure position and fixed in such a position by electrosonic welding means.

7. The method of claim 3 wherein said spring means comprises a platen having a cross member over which said first compression force is applied.

8. The method of claim 7 wherein said stacked components comprise, in order, from the rear wall of said cassette:
   said battery means;
   said platen;
   said photographic film units; and
   said dark slide.

9. The method of claim 1 wherein said film units comprise rupturable containers retaining a liquid processing composition, said containers being located substantially adjacent the trailing end, each of said film units comprising said stacked components, and said first compression means is applied in an area other than the area over said container.

10. A method for loading a cassette with photographic film units which comprises:
    providing a cassette having a forward wall including a light-transmitting portion through which a film unit can be exposed, a rear wall which comprises two apertures, and an opening at one end for receiving the ultimate contents of the cassette, one side of said opening being defined by an edge of said forward wall and another side being defined by an edge of said rear wall, said forward wall and said rear wall converging toward the end of said cassette furthest from said opening;
    stacking, in alignment with said opening, components comprising a substantially planar battery comprising terminals for supplying power to external contacts, a platen comprising a cross member over which compression force may be applied; a multiplicity of film units comprising rupturable containers retaining a liquid processing composition located adjacent the trailing ends of said film units; and a dark slide;

applying first compression means to said components in an area over said platen cross-member thereby compressing said platen;

moving said compressed stacked components toward said opening;

engaging the leading end of said compressed stacked components by second compression means capable of maintaining compression of said platen after disengagement of said first compression means;

stopping movement of said stacked components;

disengaging said first compression means from said stacked components; and moving said stacked components fully into said cassette whereby said battery terminals are accessable to external contacts through said apertures of said rear wall.

* * * * *